United States Patent [19]

Watanabe et al.

[11] Patent Number: 4,816,991

[45] Date of Patent: Mar. 28, 1989

[54] VIRTUAL MACHINE SYSTEM WITH ADDRESS TRANSLATION BUFFER FOR HOLDING HOST AND PLURAL GUEST ENTRIES

[75] Inventors: Masaya Watanabe; Shuichi Abe, both of Hadano, Japan

[73] Assignee: Hitachi, Ltd., Tokyo, Japan

[21] Appl. No.: 26,064

[22] Filed: Mar. 16, 1987

[30] Foreign Application Priority Data

Mar. 14, 1986 [JP] Japan .................................. 61-54704

[51] Int. Cl.⁴ ............................................. G06F 12/10
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,456,954 | 6/1984 | Bullions, III et al. | 364/200 |
| 4,564,903 | 1/1986 | Guyette et al. | 364/200 |
| 4,660,144 | 4/1987 | Walsh | 364/200 |
| 4,674,038 | 6/1987 | Brelsford et al. | 364/200 |
| 4,695,950 | 9/1987 | Brandt et al. | 364/200 |

*Primary Examiner*—Eddie P. Chan
*Attorney, Agent, or Firm*—Antonelli, Terry & Wands

[57] ABSTRACT

An address translation buffer in a virtual machine system is so arranged as to include a state descriptor address field for holding an address of a main memory at which a guest virtual machine state descriptor is located and which is designated by a guest virtual machine execution start instruction in addition to a pair of addresses for address translation. With this arrangement, the guest virtual machine associated with the paired addressed for address translation can be identified, while address translation information for a plurality of guest virtual machines can be simultaneously held in an address translation buffer.

2 Claims, 4 Drawing Sheets

F I G. 3
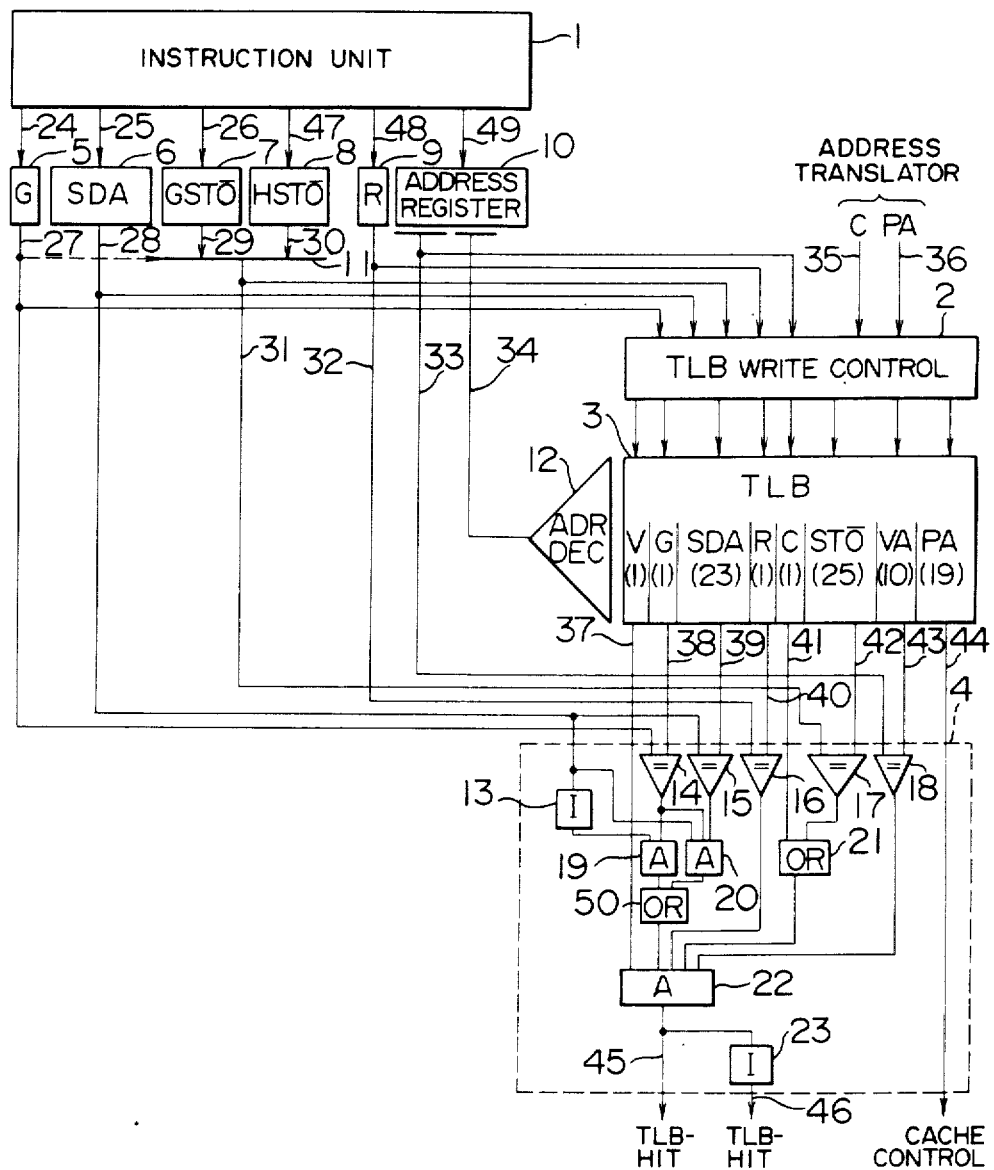

VIRTUAL MACHINE SYSTEM WITH ADDRESS TRANSLATION BUFFER FOR HOLDING HOST AND PLURAL GUEST ENTRIES

BACKGROUND OF THE INVENTION

The present invention relates to a virtual machine system having an address translation look-aside buffer (referred to as TLB).

In the virtual machine system of IBM 370 XA architecture, operation of a virtual machine (hereinafter simply referred to as VM in abbreviation) is started only after a virtual machine start interpretative execution instruction (hereinafter referred to as SIE instruction) has been executed with a host control program. FIG. 1 of the accompanying drawings shows an instruction format for the SIE instruction. As will be seen, the SIE instruction designates as operands the state descripter (hereinafter referred to as SD) which are located and identified by fields B2 and D2, respectively. Upon execution of the SIE instruction, an instruction unit of a central processing unit (hereinafter referred to as CPU) reads out the respective fields of SD from a main storage (hereinafter referred to as MS) and places the SD fields in hardware resource of the CPU to thereby permit the latter to operate as a guest VM. As the hardware resource in which the SD fields can be placed, there may be mentioned a guest mode latch, a program status word (PSW) register, a control register (CR), a general register (GR), a prefix register, an MS extent register and the like. On the other hand, the states of the host is reserved in the CPU. Thus, the SD describes the architecture of the guest VM as viewed from the side of the guest instruction.

The guest VM started in response to the SIE instruction continues to emulate a guest program until interruption or interception takes place. With the term "interruption", it is intended to mean interruptions such as, for example, input/output interruption and external interruption which require processing by the host. The interception may occur at a time point when an instruction requiring processing by the host has to be executed. Whether the interception is to be issued or not for some of privileged instructions can be designated by an interception mask field contained in the SD.

Upon occurrence of the interruption or interception, operation of the guest VM comes to an end, whereupon the CPU is set to the host mode to be restored to a state ready for executing a SIE instruction.

One of the important technological problems in the virtual machine system resides in how to define "main storage" of the guest. In the guest VM started with the SIE instruction, two modes, i.e. pageable storage mode and preferred storage mode are made use of. FIG. 2 of the accompanying drawings illustrates an address translation mechanism in the pageable storage mode. A guest virtual address (GV in abbreviation) is translated to a guest absolute address (referred to as GA) through guest address translation. It is checked for confirmation that the above mentioned GA resides within the MS extent designated by the SD. Subsequently, GA is added with the MS origin (termed MSO in abbreviation) to determine a host virtual address (HV), which is then translated to a host absolute address (HA) through host address translation. In the case of the preferred storage mode, the guest absolute address or GA is regarded to be the host absolute address (HA) without undergoing any address translation. In either mode, a pair of GV and HA are registered as the entries of the address translation look-aside buffer or TLB. Accordingly, by searching the TLB with GV (i.e. guest virtual address), the host absolute address or HA can be determined.

Concerning the TLB structure in the virtual machine system of the architecture described above, a proposal is disclosed in U.S. Pat. No. 4,456,954. According to this known proposal, each entry of the TLB is provided with a guest field of one bit which bit is set to "0" when host address translation information is registered while it is set to "1" when the address translation information for the guest VM is registered. With this arrangement, it is possible to discriminate the host entry and the guest entry from each other, to thereby allow the host address translation information together with the address translation information of one virtual machine or VM to be simultaneously held in the translation look-aside buffer or TLB. However, in view of the fact that the number of the guest VM which can be held in the TLB is limited to one, it is necessary to invalidate all the guest entries for the guest VM, when the execution of the guest VM is to be ended upon occurrence of the interruption or interception, by way of example. As a consequence, when the guest VM under consideration is to be started again by the SIE instruction, the address translation has to be performed even for making access to the entries registered at the time the preceding execution by the guest VM was ended, involving excessive overhead, which is of course undesirable from the standpoint of the instruction processing performance. In order to solve the problem mentioned above, it is necessary to implement the TLB in such a structure that the host address translation information together with the address translation information for a plurality of guest VMs can be simultaneously held and to provide means to discriminatably identify the guest VM.

As a hitherto known system including the means for discriminating or identifying the guest VM there can be mentioned the one disclosed in Japanese Patent Kokoku No. (JP-B-57-23347) (JP-A-55-113182). According to the teaching in this system, a VM-ID (a start address or end address of a location allocated on MS by an MS monitor) is utilized as the guest VM identifying information, wherein a field is provided for storing VM-ID in the address translation look-aside buffer (TLB) in combination with a register for placing therein the VM-ID. Upon retrieval of the address translation look-aside buffer or TLB, the VM-ID is previously set in the abovementioned register, wherein the VM-ID read out from the TLB is compared with the VM-ID placed in the register to thereby allow the translation of GV (guest virtual address) to HA (host absolute address) only when the comparison results in coincidence. According to this prior art technique, the content of the address translation look-aside buffer need not be cleared but can be utilized as it is even when the control is transferred from a certain guest VM to another guest VM.

However, the VM-ID is managed by the VM monitor of software nature, and it is impossible to identify what is assigned as the VM-ID when viewed from the side of hardware. Consequently, when VM-ID is to be placed in the register, it is necessary to detect by means of software what is assigned as the VM-ID, load the register with the VM-ID detected by software and start execution of the guest VM by software.

SUMMARY OF THE INVENTION

An object of the present invention is to improve the processing performance or capability of a guest VM at the execution starting time in a virtual machine system.

According to the invention, it is proposed that as the means for identifying a guest VM, an address on the MS indicating the second operand or SD of an SIE instruction which has activated the guest VM is made use of. This address will hereinafter be referred to as the SD address. To this end, each entry of the TLB is provided with the guest field for commanding which address translation information of host or guest VM is to be held and an SD address field for holding a corresponding SD address when the abovementioned entry is of the guest VM. Further, apparatus (e.g. register) is provided in which the SD address corresponding to the abovementioned guest VM is set upon issuing of an SIE instruction and which continues to hold the SD address during execution of the guest VM. In conjunction with the TLB retrieval in the course of execution of the guest VM, the TLB hit conditions are regarded to be satisfied when in each entry of the TLB, the value of the guest field is "1" and when the value of SD address field coincides with the SD address held on the register.

The SD address is the one which is determined hardwarewise for indicating the location of the state descriptor of each guest VM and can be managed on the side of hardware.

When an SIE instruction is executed, individual fields of the SD is set in the hardware resource of CPU by means of hardware. In this conjunction, it will be understood that since the SD address can also be managed hardwarewise, the SD address can be automatically placed in the allocated register.

In other words, when viewed from the side of software, execution of one SIE instruction means execution of the guest VM, whereby the information for identifying that guest VM is placed in the register.

With the arrangement according to the invention, it is thus possible to enhance the instruction processing performance of the guest VM.

BRIEF DESCRIPTION OF THE DRAWINGS

FIG. 3 is a view illustrating an embodiment of the present invention particularly in context with TLB.

DESCRIPTION OF THE PREFERRED EMBODIMENTS

Now, the invention will be described in detail in conjunction with an exemplary embodiment thereof by first referring to FIG. 3.

For convenience of description, reading-out of the address translation look-aside butter or TLB will be referred to as "retrieval of TLB (or TLB retrieval)", writing in the TLB (inclusive of invalidation thereof) will be referred to as "registration in the TLB", and both are collectively referred to as "access to the TLB".

Now referring to FIG. 3, there are shown those parts of a CPU of a virtual machine system which are relevant to the present invention, i.e. the TLB, a group of registers required for consulting the TLB, and a circuit for deciding TLB hit or TLB miss from the output of the TLB (this circuit is referred to as the TLB hit decision circuit).

Figure 1:
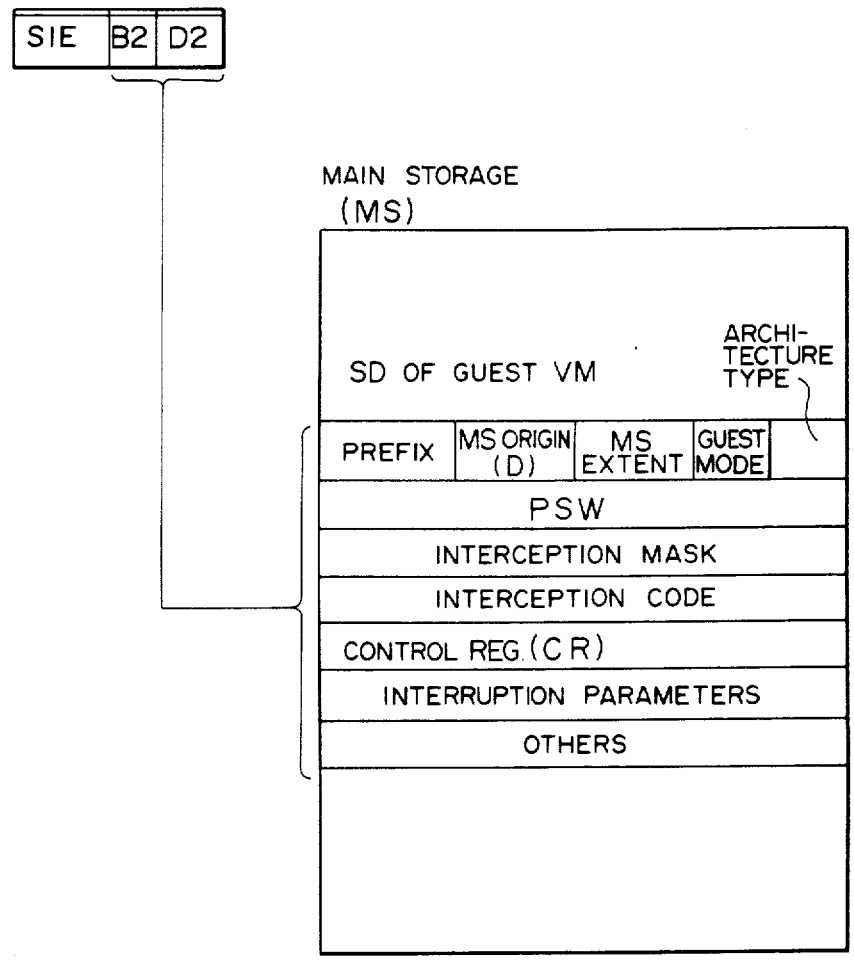
FIG. 1 is a view illustrating an SIE instruction.
Figure 2:
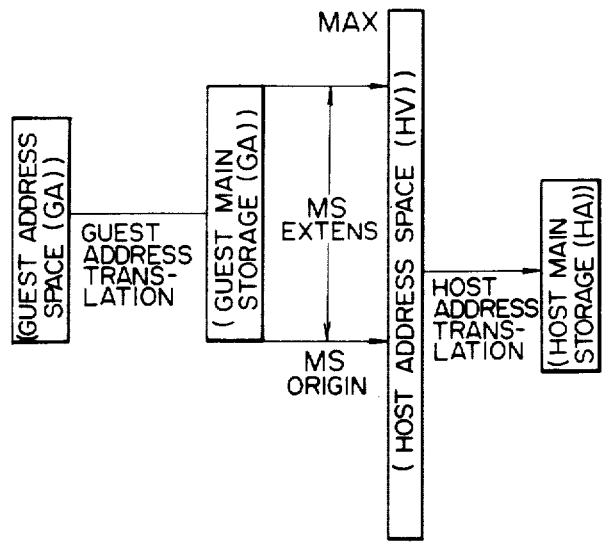
FIG. 2 is a view for illustrating address translation in a guest VM.
Figure 4:
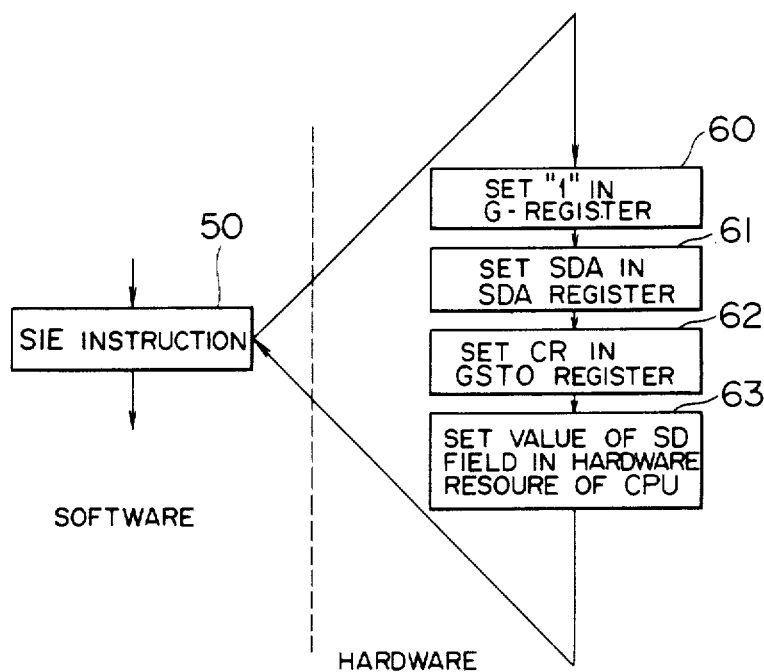
FIG. 4 is a view for illustrating the processing of the SIE instruction.

More specifically, a reference numeral 1 denotes an instruction unit, 5 denotes a guest VM mode register (also referred to as G-register), 6 denotes an SD address register (also referred to as SDA register), 7 denotes a guest segment table origin register (also referred to as GSTO register), and a numeral 8 denotes a host segment table origin register (also referred to as HSTO register). As described hereinbefore, when an SIE instruction is executed in the course running of a host program, execution by the guest VM is started. As will be seen in FIG. 4, when an SIE instruction is issued on the side of software, execution of the SIE instruction is started by a micro-instruction on the side of hardware. Hardware (micro-instruction) of the instruction execution unit 1 sets "1" in the G-register 5 (processing 60 in FIG. 4) upon processing the SIE instruction 50, places the SD address designated by the SIE instruction in the SDA register 6 (processing 61 in FIG. 4) and places the value of CR field of the SD read out from the MS in the GSTO register 7 (processing 62 in FIG. 4). Further, values of individual fields are placed in hardware resource of the CPU (processing 63 in FIG. 4), as in the case of the hitherto known system. In this way, the SIE instruction is executed. When the content of the G-register 5 is "0", the CPU operates in the host mode, while the CPU operates in the guest VM mode when the G-register 5 indicates "1". When the execution in the guest VM mode is ended due to interruption or interception in the guest program, the G-register 5 is reset to "0" by the instruction executing portion 1. The GSTO register 7 serves to identify the guest address space to be used for guest address translation. Similarly, the HSTO register 8 identifies the host address space used for the host address translation. The contents of the HSTO register 8 and the GSTO register 7 are updated when the instruction executing portion 1 executes a LCTL instruction (instruction for rewriting the control register) in the host program or guest program, respectively.

Turning back to FIG. 3, a reference numeral 10 denotes an address register used for consulting the TLB, and 9 denotes a real mode register (R-register) for indicating which of the virtual address and the real address is used for consulting the TLB. By way of example, when the instruction unit 1 refers to the TLB for reading out instruction and operands, the instruction execution unit 1 places appropriate values in the address register 10 and the R-register 9 to thereby issue the request for consulting the TLB.

The TLB is implemented in a set associative system in the case of the illustrative embodiment. More specifically, the TLB is assigned with the addresses columnwise (i.e. column addresses), wherein single or plural entries selected by a column address are termed a row which is subjected to retrieval or registration. In the case of the instant embodiment, the number of columns is 512 with a row of 1 (one). In other words, the TLB is so configured as to contain 512 entries in total. It is however obvious that the invention is not restricted to the abovementioned TLB structure but other configurations may be analogically adapted. The column address designated by 34 in FIG. 3 is constituted by the 11-th to 19-th bits of the address register 10. By decoding the column address section 34 of the address register 10 by an address decoder 12, the entry of the TLB 3 to be accessed can be selected.

Each entry of the TLB 3 is constituted by a valid field (referred to as V-field), a guest field (referred to as G-field), a state descriptor address field (referred to as SDA field), a real address field (referred to as R-field), a common segment field (referred to as C-field), a segment table origin field (referred to as STO field), a virtual address field (referred to as VA field) and an absolute address field (referred to as PA field). The numbers of bits of these fields are indicated in FIG. 3 by numerals in parenthesis. The V-field is constituted by one bit indicating whether the associated entry is valid or invalid. More specifically, when the associated entry is valid, this bit assumes "1" and otherwise assumes "0". The G-field is also constituted by one bit indicating for which of the host or guest VM the associated entry can provide the address translation information. More specifically, when the associated entry provides the address translation information for the host, the bit of this G-field assumes "0", while it assumes "1" when the entry is for the guest VM. The SDA field is meaningful when the associated entry is for the guest VM, i.e. when the G-field bit is "1", and an SD address designated by SIE instruction which activated the guest VM is stored in this SDA field of 23 bits. More specifically, since the SD is located on the 256-th byte boundary, the 1st to 23rd bits of the designated SD address is stored in the SDA field. The R-field is constituted by a single bit indicating whether the associated entry is of a real address or virtual address. The R-field bit of "0" indicates the real address while indicating the virtual address when the R-field bit is "1". The C-field is constituted by one bit which indicates that the associated entry is address translation information which contains a common segment. More specifically, when a common segment bit of a segment table entry consulted in the host address translation in the host mode as well as in the guest address translation in the guest VM mode is "1", the C-field bit assumes "1". The STO field indicates the segment table origin at the time of address translation of the associated entry. In the case of the IBM 370/XA architecture, the 1st to 25-th bits of the STO represents an address, and the STO field is of 25 bits. The VA field is of ten bits for storing bits except for those of the column address among the page frame addresses for accessing the TLB. More specifically, the VA field stores 1st to 10th bits. The PA field stores 19 bits which constitute the page frame address of the absolute address.

The TLB hit decision part 4 is composed of comparison circuits 14 to 18, AND gates 19, 20 and 22, OR gates 21 and 50 and NOT gates 12 and 13. The comparison circuit 14 compares the G-field output 38 of the TLB with the G-register output 27 and produces logic "1" signal when the comparison results in coincidence. The comparison circuit 15 compares the SDA-field output 39 of the TLB with the SDA register output 28. The TLB hit condition for the VM system is established through the AND gates 19 and 20, the NOT gate 13 and the OR gate 50. More specifically, when the G-field bit of TLB entry is "0" in the host mode (i.e. G-register 5 is "0") or when the G-field of TLB entry is "0" in the guest VM mode (G-register 5 is "1") and additionally when the SD address (the value of SDA register 6) of the guest VM being currently under execution coincides with the SDA field of TLB entry, the OR gate 50 outputs "1". On the other hand, the OR gate 21 serves to establish the TLB hit condition for the address space. More specifically, when the TLB entry contains the common segment (i.e. C-field of TLB is "1") or when the value of STO of TLB entry coincides with the current STO value 31, the OR gate 21 outputs "1". In this connection, it should be mentioned that as the current STO value 31, value of either GSTO register 7 or HSTO 8 is selected by a selector 11 in correspondence to the content of the G-register 5. Through the AND gate 22, the TLB hit signal 45 is produced. On the other hand, the TLB miss signal 46 is produced through the NOT gate 23. The TLB hit signal 45 and the PA-field output 44 are transferred to a cache controller (not shown). The TLB miss signal 46 is transferred to an address translator (not shown).

In FIG. 3, a reference numeral 2 denotes a TLB write controller which controls the TLB registration through address translation and invalidation of TLB entry. Upon TLB registration, the G-field, SDA field, R-field, STO field and VA field are loaded with values of the G-register 5, SDA register 6, R-register 9, STO 31 and the address register 10, respectively. On the other hand, the C-field and the PA field store the values transferred from the address translator.

The present invention is characterized in that the SD address is adopted as the means for identifying the guest VM in the address translated. In other words, in connection with execution of SIE instruction, the SDA register in which the SD address of the guest VM is placed is provided in terms of hardware in combination with provision of the SDA field in each entry of the TLB and the means for comparing value of the SDA field of TLB entry read out to the TLB hit decision circuit with the value of the SDA register. The SDA register is loaded with the SD address hardwarewise upon execution of SIE instruction. With this arrangement, it is now possible to hold simultaneously the address translation information for both a host and plural guest VMs. Further, execution of only one SIE instruction is sufficient for the guest VM be dispatched when viewed from the side of software.

We claim:

1. A virtual machine system, comprising:
   an instruction execution unit commanding the start of execution of a guest virtual machine by setting in hardware resources of a central processing unit necessary fields of a guest virtual machine state descriptor on a main memory designated by a start interpretative execution instruction for said guest virtual machine upon execution of said instruction;
   an address translation buffer having a plurality of entries each holding a pair of addresses for address translation between an address of an address space used by said guest virtual machine and an address of an address space on said main storage;
   each entry of said address translation buffer including a state descriptor address for holding and address of said state descriptor on said main storage designated by said start interpretative instruction for said guest virtual machine;
   a state descriptor address register which is loaded with a state descriptor address of a guest virtual machine currently running through said instruction execution unit upon execution of said instruction; and
   comparison means for comparing the content of said address register and that of said state descriptor address of said address translation buffer upon accessing to said guest virtual address space by said guest virtual machine, to thereby decide that the address translation by said address translation buffer is successful only when said comparison results in a coincidence.

2. A virtual machine system according to claim 1, wherein each entry of said address translation buffer further includes a segment table origin address field for indicating a segment table origin (STO) and a guest field for indicating which of said paired addresses for said guest virtual machine or host is held;

said comparison means additionally comparing contents of a segment table origin and a guest or host mode designated by said instruction execution unit with the content of said guest field and said segment table origin field respectively.

* * * * *